United States Patent [19]
Harding

[11] Patent Number: 6,067,012
[45] Date of Patent: May 23, 2000

[54] APPARATUS FOR CONCEALING EMERGENCY VEHICLE WARNING DEVICES

[76] Inventor: Phil Harding, 907 S. Corona St., Denver, Colo. 80209

[21] Appl. No.: 09/008,764

[22] Filed: Jan. 19, 1998

Related U.S. Application Data

[63] Continuation-in-part of application No. 08/525,270, Sep. 7, 1995, abandoned.

[51] Int. Cl.[7] .............................. B60Q 1/52; B60Q 1/00
[52] U.S. Cl. ..................... 340/472; 340/471; 340/480; 340/487; 362/479; 362/493; 362/527
[58] Field of Search .................... 340/472, 471, 340/468, 480, 487; 362/386, 248, 162, 542, 472, 479, 493, 527, 285, 286, 508, 232; 296/180.1, 91

[56] References Cited

U.S. PATENT DOCUMENTS

| | | | |
|---|---|---|---|
| 3,264,607 | 8/1966 | Sherman | 340/472 |
| 3,439,326 | 4/1969 | Boudin | 340/472 |
| 3,758,772 | 9/1973 | Eyb | 362/529 |
| 4,081,788 | 3/1978 | Gaspar | 116/40 |
| 4,380,789 | 4/1983 | Craig | 362/527 |
| 4,577,178 | 3/1986 | Hitora | 340/472 |
| 4,707,014 | 11/1987 | Rich | 296/180.1 |
| 4,787,665 | 11/1988 | Rich | 296/180.1 |
| 4,860,175 | 8/1989 | Antrim | 362/527 |
| 5,091,828 | 2/1992 | Jincks et al. | 362/542 |
| 5,311,411 | 5/1994 | Garolfi | 362/493 |

*Primary Examiner*—Donnie L. Crosland
*Attorney, Agent, or Firm*—Fields and Johnson, P.C.

[57] ABSTRACT

This apparatus conceals an emergency warning device, which may be in the form of an array of laterally spaced lights and/or sirens, mounted on an emergency vehicle below a vertically movable roof section in an opening formed in the roof of the emergency vehicle. In a first lowered position, the lights are concealed below the roof line of the vehicle. A power source, such as an electric motor, can be selectively activated to raise the roof section above the roof line of the vehicle so that the lights attached thereto are also raised above the roof line and pivoted into a second operative position.

14 Claims, 2 Drawing Sheets

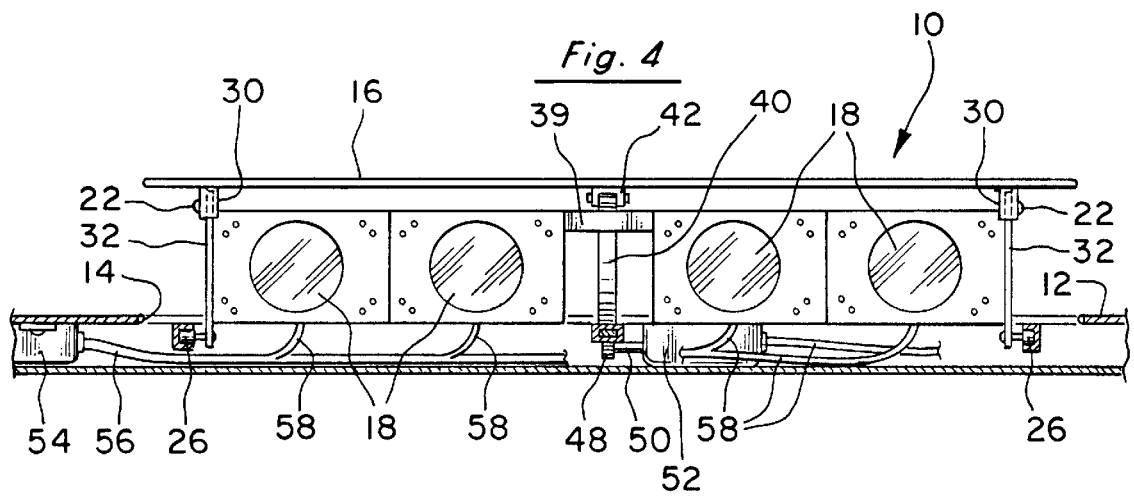
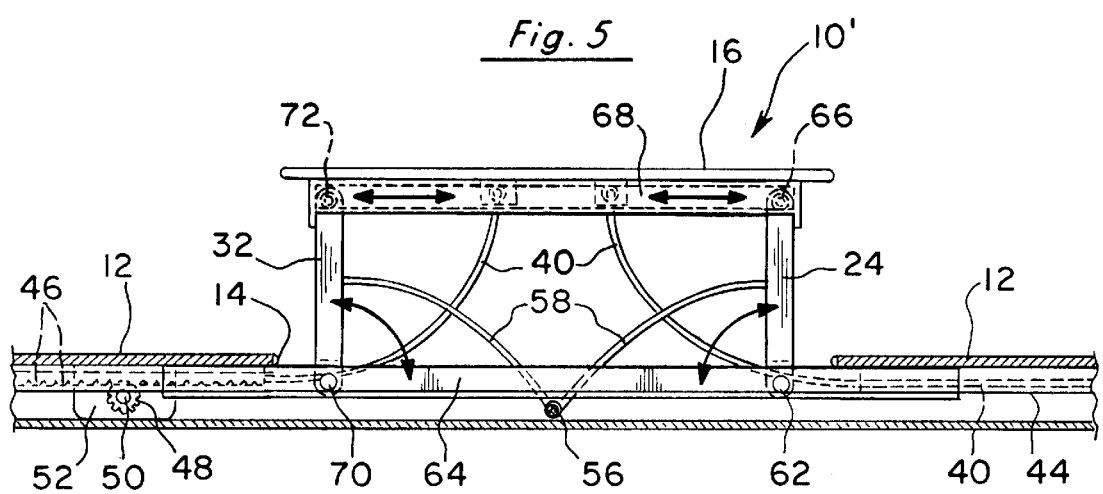
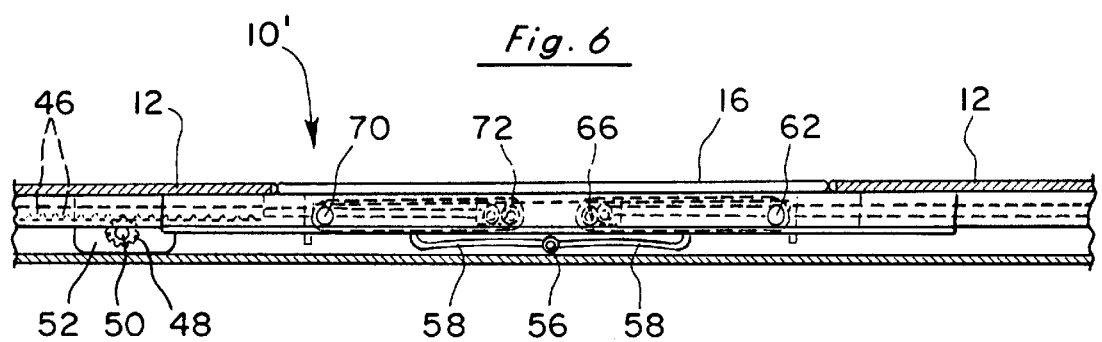

APPARATUS FOR CONCEALING EMERGENCY VEHICLE WARNING DEVICES

TECHNICAL FIELD

This patent application is a continuation-in-part of my U.S. Ser. No. 08/525,270, filed Sep. 7, 1995, and entitled "Device For The Concealment Of Emergency Vehicle Lights" now abandoned.

This invention relates to an apparatus for the concealment of emergency warning devices, such as lights and sirens, on emergency vehicles, such as police cars and ambulances, and more particularly to an apparatus wherein the emergency warning devices are attached to a vertically movable roof panel which can be raised to bring them into operative position or can be retracted to conceal them while providing a smooth aerodynamic exterior roof contour.

BACKGROUND ART

Emergency vehicles typically have their emergency lights or sirens located on the top of the roof of their vehicles or they must be manually placed on the top of "undercover" vehicles which normally have the appearance of a conventional automobile. There are no known designs which conceal emergency vehicle warning devices under a vertically movable roof panel in the roof structure of a vehicle.

Prior art devices are known for non-emergency lights to be used either in roll bars or for hidden headlights on the front hood of a vehicle. Some of these devices have provided improvements in the aerodynamics of truck lighting in roll bars or headlights for vehicles.

The following patents are typical of the prior art:

U.S. Pat. No. 4,380,789 to Craig utilizes a concealable headlight assembly in the hood of the vehicle.

U.S. Pat. No. 4,707,014 to Rich shows an automotive roof spoiler having retractable concealable lamps. Rich's invention is limited to use in a spoiler and is designed for use with trucks and other vehicle without any concept of use with emergency lights and sirens.

U.S. Pat. No. 3,264,607 to Sherman discloses a retractable emergency beacon wherein a circular opening is made in the roof of the vehicle and the emergency light is positioned within the opening and below the roof and is hydraulically operated for raising it above the roof during use.

U.S. Pat. No. 5,311,411 to Garolfi discloses a fog light which is pivotally mounted on the roof of a vehicle for movement between a closed position, wherein the light is below the roof and is concealed by the light housing, and a raised position wherein the light is exposed. The exposed portion of the housing has the same contour as the roof.

While each of these prior art devices is satisfactory for its intended use, none provide a roof panel which has emergency lights and/or sirens attached to its lower surface so that the roof section and the lights can be raised and lowered together and wherein the apparatus conceals the emergency lights which fold down inside the roof structure for the purposes of increasing aerodynamic efficiency of the vehicle and also concealing the emergency lights and sirens for more covert assignments of the emergency vehicle.

DISCLOSURE OF THE INVENTION

This invention comprises of an apparatus that conceals an emergency warning device which may be in the form of an array of laterally positioned lights and/or sirens mounted on an emergency vehicle below a vertically movable roof section in an opening in the roof of the emergency vehicle. In a first lowered position, the lights are concealed below the roof line of the vehicle. A power source, such as an electric motor, can be selectively activated to raise the roof section above the roof line of the vehicle so that the lights attached thereto are also raised above the roof line and pivoted into a second operative position.

In one preferred embodiment, the emergency warning device has an upper end which is pivoted to the bottom side of the vertically movable roof section. The lower edge of the emergency warning device is provided with a roller mechanism movable along a track. When the apparatus is in the closed collapsed position, the emergency warning device is pivoted into a position wherein it is substantially parallel to the bottom of the roof section. With in the raised position, the emergency warning device is substantially perpendicular to the bottom of the roof section. During raising and lowering of the roof section, roller mechanism moves along the tracks to position the emergency warning device in the proper orientation.

In another embodiment of this invention, the emergency warning device is pivoted to the roof structure below the roof line and the upper end thereof is provided with rollers which move along tracks which are attached to and are generally parallel to the bottom of the roof panel.

A source of power, such as a reversible electric motor, is connected by a flexible extension arm to the roof panel. When the roof panel is in the lowered position and the motor is activated, the flexible extension arm pushes the roof panel outwardly into the raised position causing the emergency warning device to move from its closed position essentially parallel to the bottom of the roof panel to its open position in which it is substantially perpendicular thereto. To close the roof panel, power to the reversible motor is reversed causing the flexible extension arm to pull the roof panel downwardly into a closed position wherein it is substantially level with the roof line. During this movement, the emergency warning device is pivoted from its open position to its closed position.

The apparatus described for the concealment of the emergency warning device provides for a smooth exterior surface when retracted thereby reducing air drag. Furthermore, the movement of the roof panel, with the attached emergency warning devices, from the closed position to the open position and back again may be done from within the passenger compartment thereby eliminating the requirement for manually activating side mounted lights.

Other advantages of the present invention will be apparent from the following description when taken in conjunction with the accompanying drawings.

BRIEF DESCRIPTION OF THE DRAWINGS

FIG. 4 is an enlarged horizontal section, taken along line 4—4 of FIG. 1 showing the front of the emergency warning device;

FIG. 5 is an enlarged horizontal section, similar to FIG. 2 but showing an alternative embodiment of the emergency warning device in the raised position; and FIG. 6 is an enlarged horizontal section, similar to FIG. 3 but showing the alternative embodiment of the emergency warning device in the lowered position.

BEST MODE FOR CARRYING OUT THE INVENTION

Figure 1:
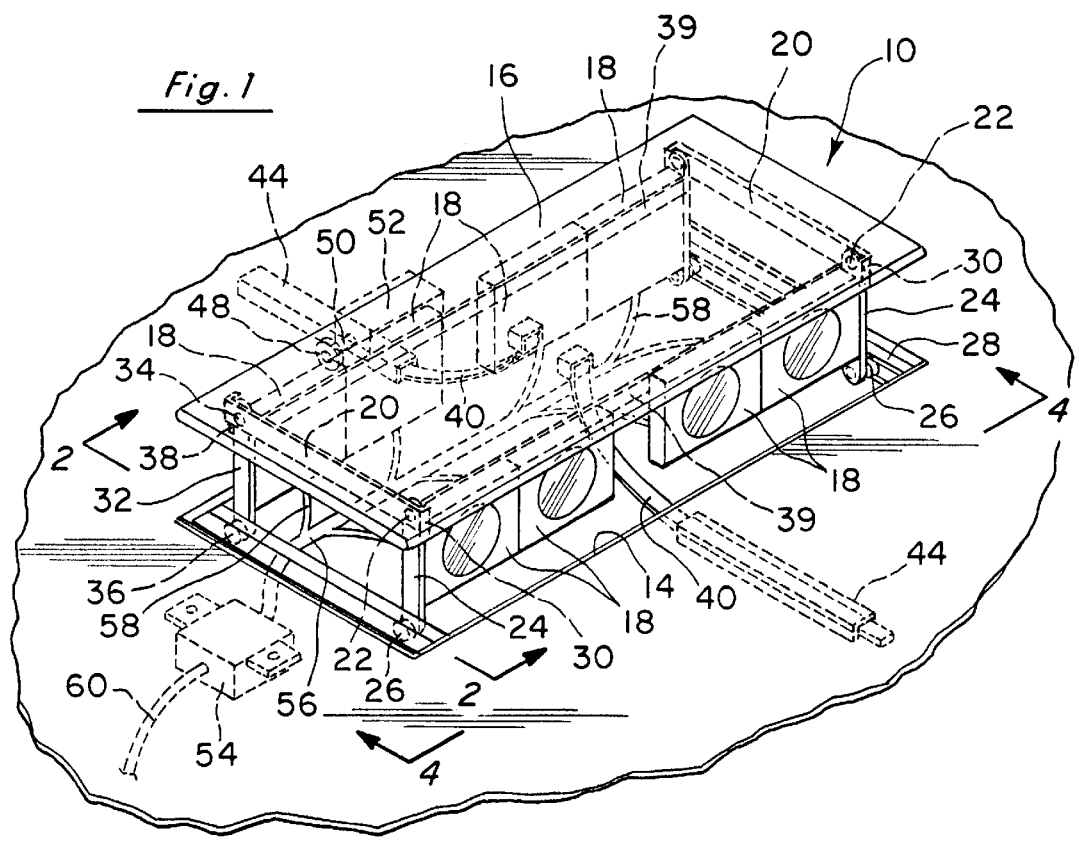
FIG. 1 is fragmentary perspective view of the top of an emergency vehicle showing a first embodiment of the emergency warning device of this invention in the raised position.
Figure 2:
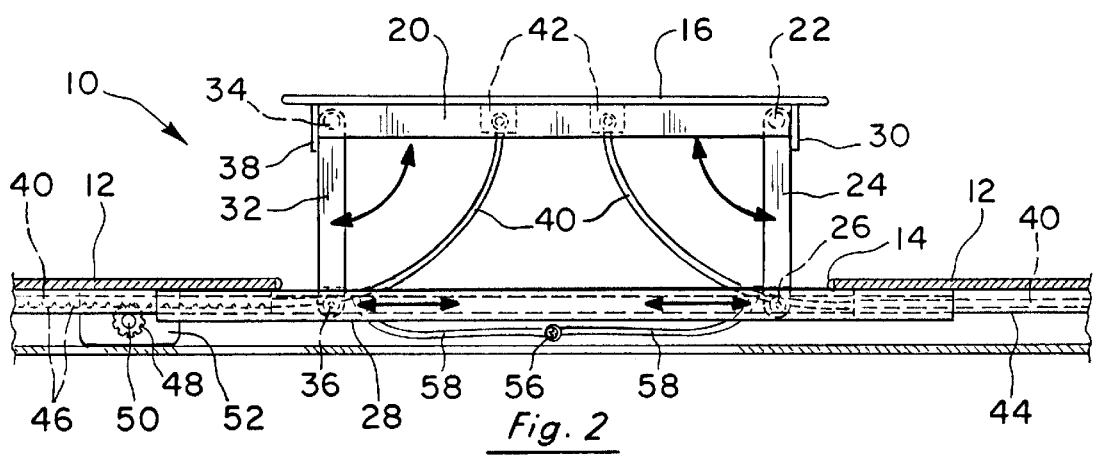
FIG. 2 is an enlarged horizontal section, taken along line 2—2 of FIG. 1 showing details of the mechanism for raising and lowering the roof panel.
Figure 3:
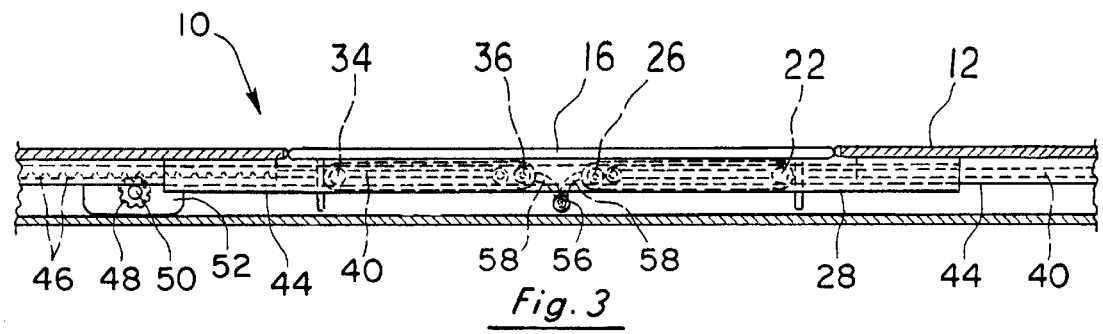
FIG. 3 is an enlarge horizontal section similar to FIG. 2 but showing the roof panel in its lowered position.

In accordance with this invention, an emergency warning device 10 is provided on the roof 12 of an emergency vehicle for selective movement between a lowered concealed position and a raised operative position. In the embodiment of FIGS. 1–4, roof 12 has an opening 14 therein through which emergency warning device 10 is raised and lowered. A roof panel 16 is dimensioned to close opening 14 when in the lowered position. Conveniently, appropriate weather seals (not shown) can be provided around the edges of opening 14 and roof panel 16 to minimize air and water leakage.

Depending from the forward edge of roof panel 16 is a front array of laterally positioned panel lights 18 wherein the innermost and outermost pairs of lights are interconnected. End members 20 at opposite ends of roof panel 16, as shown, have pivot pins 22 to which the upper end of to support arms 24 are pivoted. The outermost lights 18 are attached to support arms 24 so that the array of lights and support arms 24 pivot together as a unit. The lower end of each arm 24 is provided with a roller 26 which is confined within and moves along respective tracks 28 mounted at the longitudinal edges of opening 14. The array of lights 18 and support arms 24 can pivot from the substantially vertical open position shown in FIG. 2 to a substantially horizontal closed position so that the array of panel lights 18 are folded under and parallel to roof panel 16 shown in FIG. 3. During closing, rollers 26 move rearwardly along their respective tracks 28. During opening, rollers 26 move forwardly along their respective tracks 28. This rotational movement is limited by engagement of support arms 24 with forward stop members 30, respectively.

A rear array of lights 18 is attached to a pair of support arms 32 whose upper ends are pivoted to pivot pins 34 at the rear end of end members 20. The lower end of each support arm 32 has a roller 36 mounted in and for movement along tracks 28, respectively. More specifically, rollers 36 move forwardly along tracks 28 during closing and move rearwardly therealong during opening of roof panel 16. The rotational movement of the rear array of lights is limited by rear stop member 38. The length of the roof panel 16 is at least twice the height of the array of panel lights 18 of emergency warning device 10 so that the front array of lights and the rear array of lights can be folded under roof panel 16 and stored in their folded position. If desired, a pair of lateral reinforcing bars 39 can be provided across the underside of the roof panel 16 near the front and rear edges thereof, respectively, for added strength.

Conveniently, a pair of curvable lifting members 40 are provided. Each has a first end connected to respective supports 42 attached to the bottom of roof panel 16 near the center thereof, as show. The other end of each lifting member 40 is slidably received within a guide 44 attached to the lower side of roof 12. At least one of lifting members 40 has ribs or teeth formed on the lower side near the distal end, such as rearmost lifting member 40, for engagement with drive gear 48 which is driven through drive shaft 50 by reversible drive motor 52. The motor may be activated by means, not shown, inside the vehicle. When the motor is driven in one direction, the roof panel 16 will be pushed upwardly from the closed position of FIG. 3 to the raised position of FIG. 2 and rollers 26 and 36 will move longitudinally along respective tracks 28 causing support arms 24 and 32 to rotate about pivot pins 22 and 34 from the position of FIG. 3 wherein these support arms and their attached array of light panels 18 are generally parallel to and below roof panel 16 to the position of FIG. 2 wherein they are substantially perpendicular to the roof panel and are positioned above the roof line of the vehicle. Likewise, when the motor is driven in the opposite direction, the roof panel 16 will be pulled downwardly by lifting members 40 from the raised position of FIG. 2 to the closed position of FIG. 3 causing rollers 26 and 36 to move along respective tracks 28 causing support arms 24 and 32 to be rotated about pivot pins 22 and 34, respectively, in the opposite direction to fold them and the associated lights 18 back under roof section 16 to the lowered position shown in FIG. 3. In order to prevent binding the actual position of the support arms 24 and 32 and the attached light sections 18 can be slightly less than perpendicular when apparatus 10 is in the raised position of FIGS. 1 and 2. Although a drive mechanism is only shown with the rearmost lifting member 40, it will be understood that a similar drive mechanism could be provided with the forwardmost lifting member 40, as well. It will be understood that other devices which are apparent to one of ordinary skill in the art may be used for raising and lowering the apparatus.

A control box 54 is attached to the underside of roof 12, as shown in FIG. 1, for supply signals through conduit 56 and branch wires 50 to lights 18. The specific operation of lights 18 can be generated by signals from the operator of the vehicle provided through input wire 60 to control box 54. Sirens can be substituted for some of lights 18, if desired.

In the alternative embodiment of FIGS. 5 and 6, the pivoting of support arms 24 and 32 and the light sections 18 are reversed. In other words, support arm 24 is pivoted at its lower end about pivot pin 62 mounted on a support bar 64 attached to the underside of roof 12. The upper end of support arm 24 has a roller 66 which is movable along track 68, attached to the underside of roof section 16. Similarly, the lower end of support arm 34 is pivoted by pivot pin 70 attached to support bar 64 and the upper end thereof has a roller 72 mounted for movement along track 68. Thus, the upper ends of support arms 24 and 32 and the associated lights 18 fold inwardly when apparatus 10 is moved from the raised position of FIG. 5 to the lowered or closed position of FIG. 6. The lifting members 40 will be operated in the same manner as described above with respect to the first embodiment.

From the foregoing, the advantages of this invention are readily apparent. An apparatus for concealing emergency vehicle warning devices is provided wherein an emergency warning device having an array of lights is attached below a roof section which may be raised to expose the emergency warning device or lowered to cause it to be folded under the roof section for concealment. The roof section when lowered provides a smooth continuous contour with the roof line of the vehicle.

This invention has been described in detail with reference to particular embodiments thereof, but it will be understood that various other modifications can be effected within the spirit and scope of this invention.

I claim:

1. An apparatus for concealing an emergency warning device in an opening in the roof of an emergency vehicle, said apparatus comprising:

an emergency vehicle roof having a roof line and an opening formed therein for receiving an emergency warning device, said opening having laterally spaced longitudinal side edges;

a roof section having an upper surface corresponding in contour to said roof line, a lower surface, a forward edge and a rear edge, said roof section being sized to fit said opening and positioned for movement between an open raised position above said opening and a closed lowered portion wherein said roof section conforms to said roof line and closes said opening;

a track attached to one of said lower surface of said roof section and said roof below said roof line;

an emergency warning device having an upper end pivotally connected to said roof section to form a first pivot connection and having a lower end pivotally connected to said roof within said opening to form a second pivot connection, one of said ends having a roller attached to and movable along said track for folding said emergency warning device under and substantially parallel to said roof section when said roof section is moved from said open raised position to said closed lowered position; and at least one lifting member connected to said lower surface of said roof section for moving said roof section between said open raised position and said closed lowered position.

2. An apparatus, as claimed in claim 1, further including:

said track is attached to said roof below said roof line and adjacent at least one of said side edges of said opening; and said roller is mounted in said track and connected to said lower end of said emergency warning device so that said emergency warning device is pivotable about said pivot connections and said roller is movable along said track to fold said emergency warning device under said roof section when said roof section is moved from said open position to said closed position.

3. An apparatus, as claimed in claim 2, wherein:

said emergency warning device is a first array of laterally positioned light panels facing at least in either a forwardly or rearwardly direction.

4. An apparatus, as claimed in claim 2, wherein:

said emergency warning device is a first array of laterally positioned light panels and sirens facing at least in either a forwardly or rearwardly direction.

5. An apparatus, as claimed in claim 3, wherein:

said emergency warning device includes a first array facing forwardly and a second array facing rearwardly.

6. An apparatus, as claimed in claim 5, wherein:

said emergency warning device has a height; and said roof section has a length which is at least twice the height of said emergency warning device wherein said first array folds down under a front portion of said roof panel and said second array folds down under a rear portion of said roof panel.

7. An apparatus, as claimed in claim 2, further including:

a support arm having an upper end and a lower end and being connected between its ends to said emergency warning device, said upper end forming said first pivot connection and said lower end forming said second pivot connection and being attached to said roller.

8. An apparatus, as claimed in claim 1, further including:

said track is attached to said lower side of said roof section; and said roller is mounted in said track and connected to said upper end of said emergency warning device so that said emergency warning device is pivotable above said pivot connections and said roller is movable along said track to fold said device under said roof section when said roof section is moved from said open position to said closed position.

9. An apparatus, as claimed in claim 8, wherein:

said emergency warning device is a first array of laterally positioned light panels facing at least in either a forwardly or rearwardly direction.

10. An apparatus, as claimed in claim 8, wherein:

said emergency warning device is a first array of laterally positioned light panels and sirens facing at least in either a forwardly or rearwardly direction.

11. An apparatus, as claimed in claim 8, wherein:

said emergency warning device includes a first array facing forwardly and a second array facing rearwardly.

12. An apparatus, as claimed in claim 11, wherein:

said emergency warning device has a height; and said roof section has a length which is at least twice the height of said emergency warning device wherein said first array folds down under a front portion of said roof panel and said second array folds down under a rear portion of said roof panel.

13. An apparatus, as claimed in claim 8, further including:

a support arm having an upper end and a lower end and being connected between its ends to said emergency warning device, said upper end forming said first pivot connection and being attached to said roller and lower end forming said second pivot connection.

14. A method for concealing an emergency warning device in an opening in the roof of an emergency vehicle, said method comprising the steps of:

providing an emergency vehicle roof having a roof line;

forming an opening in said vehicle roof for receiving an emergency warning device;

providing a roof section for selective vertical movement between a closed lowered position and a raised position;

attaching the emergency warning device under the roof section; and selectively raising said roof section from said closed lowered position to said raised position and lowering said roof section from said raised position to said closed lowered position;

rotating the warning device from a concealed position substantially parallel to the roof section when the roof section is in said closed lowered position to an operative position substantially perpendicular to the roof section when the roof section is raised; and rotating the warning device from said operative position substantially perpendicular to the roof section when said roof section is in said raised position to said concealed position substantially parallel to the roof section when the roof section is lowered.

* * * * *